United States Patent [19]
Johnson

[11] Patent Number: 5,875,880
[45] Date of Patent: Mar. 2, 1999

[54] ARTICLE GROUPER AND ESCAPEMENT FOR CONTINUOUS MOTION PACKER

[75] Inventor: Lloyd D. Johnson, Portland, Conn.

[73] Assignee: Standard-Knapp, Inc., Portland, Conn.

[21] Appl. No.: 745,414

[22] Filed: Nov. 8, 1996

[51] Int. Cl.[6] .................................................. B65G 47/26
[52] U.S. Cl. ..................................... 198/419.3; 198/418.2
[58] Field of Search ........................... 198/418.2, 418.3, 198/419.2, 419.3

[56] References Cited

U.S. PATENT DOCUMENTS

| | | | |
|---|---|---|---|
| 4,552,261 | 11/1985 | Raudot et al. ............................ | 198/425 |
| 4,637,509 | 1/1987 | Roudat et al. ......................... | 198/419.3 |
| 5,065,856 | 11/1991 | Reid et al. ............................ | 198/419.3 |
| 5,203,444 | 4/1993 | Munch .................................. | 198/419.3 |
| 5,638,665 | 6/1997 | Muller ................................. | 198/419.3 |
| 5,667,055 | 9/1997 | Gambetti .............................. | 198/419.3 |

*Primary Examiner*—David A. Bucci
*Assistant Examiner*—Gregory A. Morse
*Attorney, Agent, or Firm*—McCormick, Paulding & Huber

[57] ABSTRACT

A grouping system for a packaging line is provided with first and second pin conveyors adapted to group predetermined number of articles in a line without segregating the group from the line has the ability to feed the line of articles in timed relationship to a third pin conveyor which engages the leading group of articles from the line to accelerate it into a flight bar conveyor system provided in a continuous motion packer that is capable of packing the group of articles into a case fed into the load station in timed relationship with the progress of the article group through that load station.

4 Claims, 4 Drawing Sheets

ARTICLE GROUPER AND ESCAPEMENT FOR CONTINUOUS MOTION PACKER

BACKGROUND OF THE INVENTION

This invention relates generally to article grouping systems capable of forming discrete groups of articles so that these article groups can be loaded into upwardly open packing cases, and deals more particularly with a grouper of the pin type having upstanding pins for entry between adjacent round articles in a line or column of articles. A predetermined number of the articles are first trapped between a pair of pin sets that serve to continuously hold back the line of articles as each group of articles is selected for release. The leading pin set moves downwardly out of the path of the articles and a second pin set holds back the articles in the line.

Prior art systems for grouping articles have generally taken the form of two sets of pins on separately controlled chain conveyors that are driven at variable speed. See, for example, Pat. No. 4,552,261 entitled ARTICLE GROUPER FOR A CASE BACKER and assigned to the assignee herein. In the '261 Patent, the variable speed is provided for in the form of a differential drive between the two pin sets.

In a later adaptation of that invention, two separate pin conveyors are driven at variable speed by separately controlled servo motors that serve essentially the same purpose as that of the variable speed drive in the '261 Patent. See, for example, Pat. No. 5,065,856.

The general purpose of the present invention is to provide for a constant speed drive to the two sets of pin conveyors so that each article group is first segregated between these pin sets and released for acceleration by a third pin set downstream of the pair of pin sets referred to previously. Such a system provides product grouping into a conventional flight bar system capable of controlled movement of each group of articles into and through the load station in accordance with conventional practice.

SUMMARY OF THE INVENTION

In accordance with the present invention, an apparatus is provided for grouping articles and releasing each segregated group to a flight bar system for packaging of the articles at a load station. The apparatus in its presently preferred form comprises an infeed conveyor, lane guides for confining the articles for movement in parallel side-by-side columns, two pin conveyor chains driven by two separately controlled motors through closed paths that are generally congruent with one another, these paths being defined below the articles in the columns as they are advanced downstream on underlying conveyor chains.

The pin conveyor chains have upwardly projecting article engagable pin sets provided at spaced locations on each of the pin conveyor chains so that these first and second pin sets move between the article rows to group predetermined numbers of articles in each column while holding back the columns upstream of the pin sets. It is a feature of the invention that each pin set is so spaced with respect to the other that as one of said pin sets moves downwardly out of engagement with the articles, the second pin set holds back the articles upstream of a preselected group of articles. In this manner, the group of articles can be released for engagement by a third pin conveyor downstream of the first and second pin sets. This third conveyor acts on each group of articles so released for accelerating each group up to the speed of the flight bar conveyor system that will move each group into and through the. load station.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE PREFERRED EMBODIMENT

Figure 1:
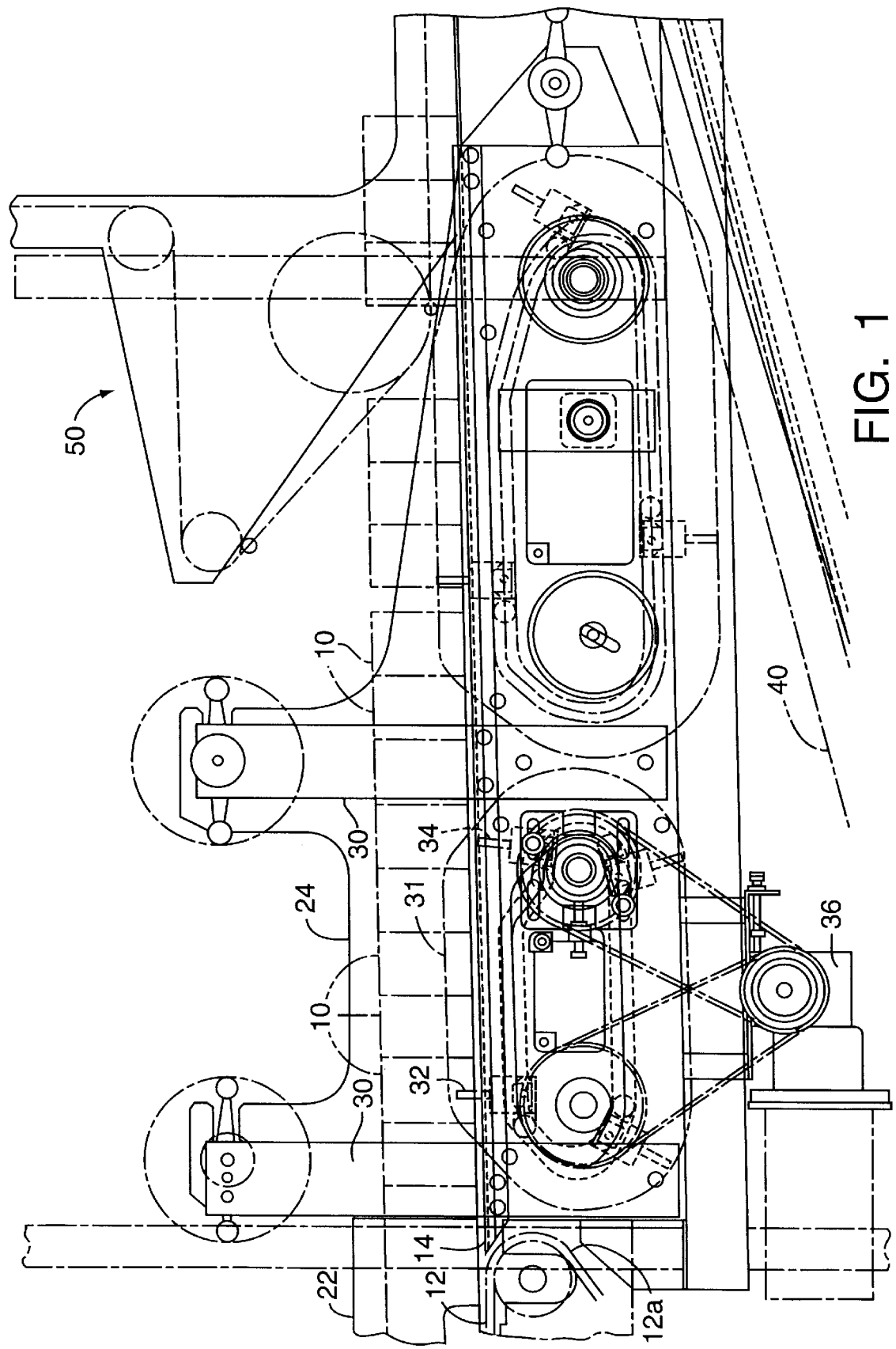
FIG. 1 shows in vertical elevation, a column of articles advancing downstream for engagement with first and second pin sets which are so spaced with respect to one another as to trap a predetermined number of articles or groups of articles therebetween and to move them at a somewhat slower speed than the underlying chain conveyor which drives them into the structure shown. An overhead flight bar conveyor system is provided for advancing the groups of articles through the packer (not shown), and this flight bar conveyor is fed each group of articles in turn by accelerating each article group in timed relationship toward the load station.
Figure 2:
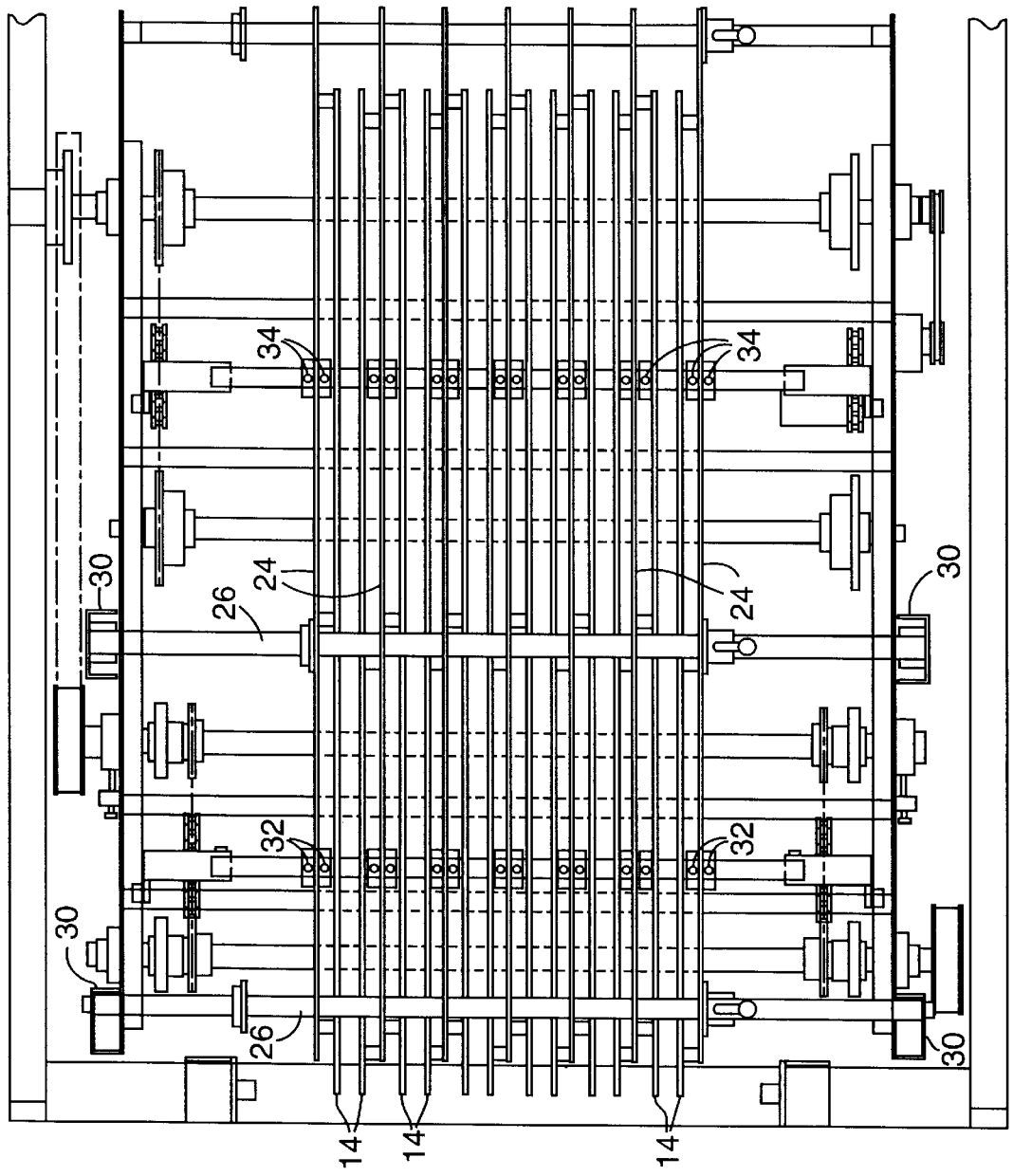
FIG. 2 is a top plan view of the apparatus depicted in FIG. 1.

Turing now to the drawings in greater detail, FIG. 1 shows a continuous stream of articles 10 fed from left to right or in the downstream direction by an underlying infeed conveyor 12 such that the articles are advanced by line pressure off the downstream end 12a of the infeed conveyor 12 onto riding strips 14, 14 best shown in FIG. 2 and extending between upstanding support frame members and Lane guides 22, 22 are provided over the infeed conveyor 12 so as to restrict the movement of the articles in side-by-side columns as they advance onto the riding strips 14. Lane guides 24 are provided downstream of the infeed conveyor for the same purpose and serve to maintain the side-by-side columns of articles for movement through the grouper to be described.

Figure 3:
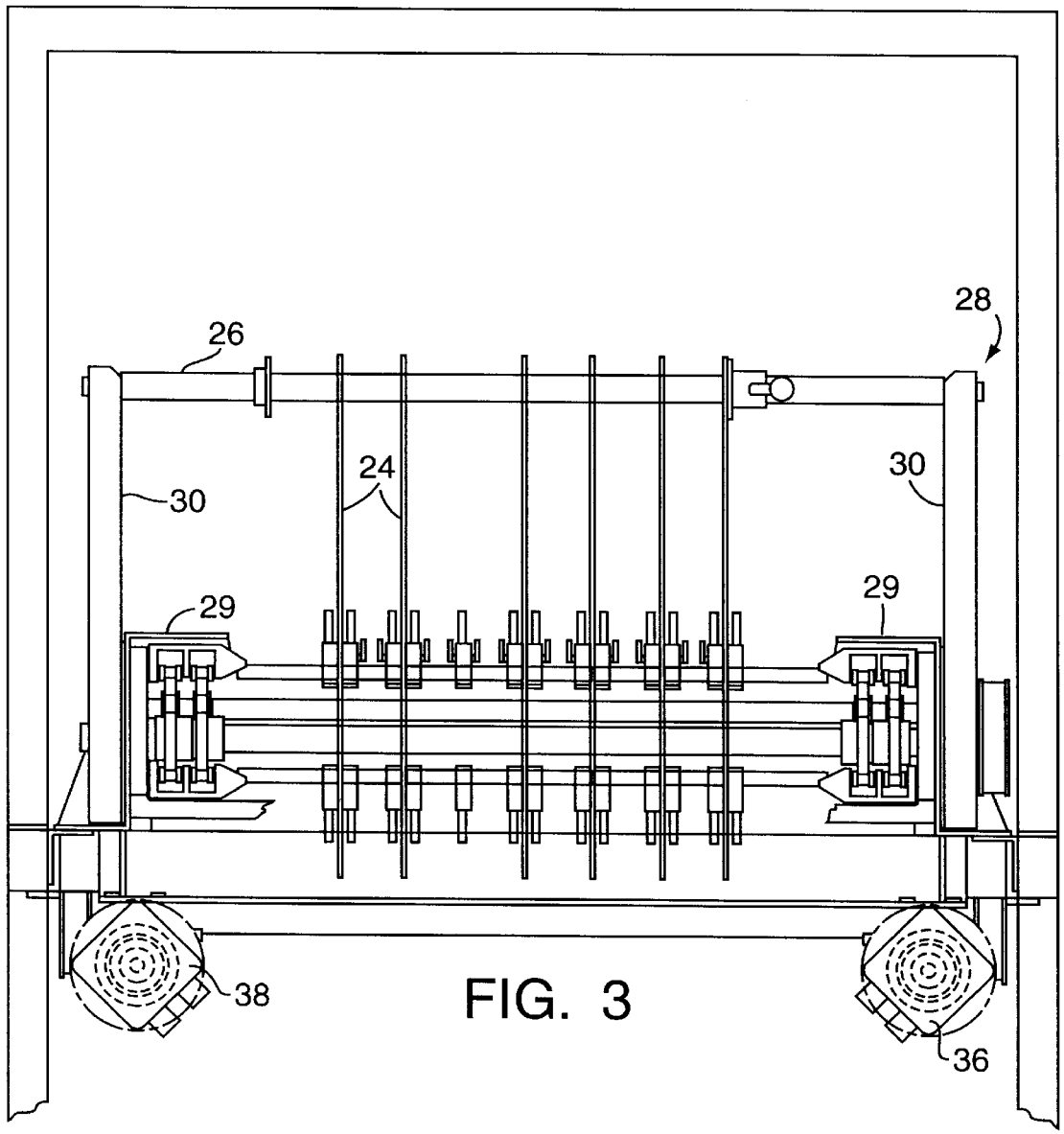
FIG. 3 is a sectional view taken generally on the line 3,3 of FIG. 1
Figure 4:
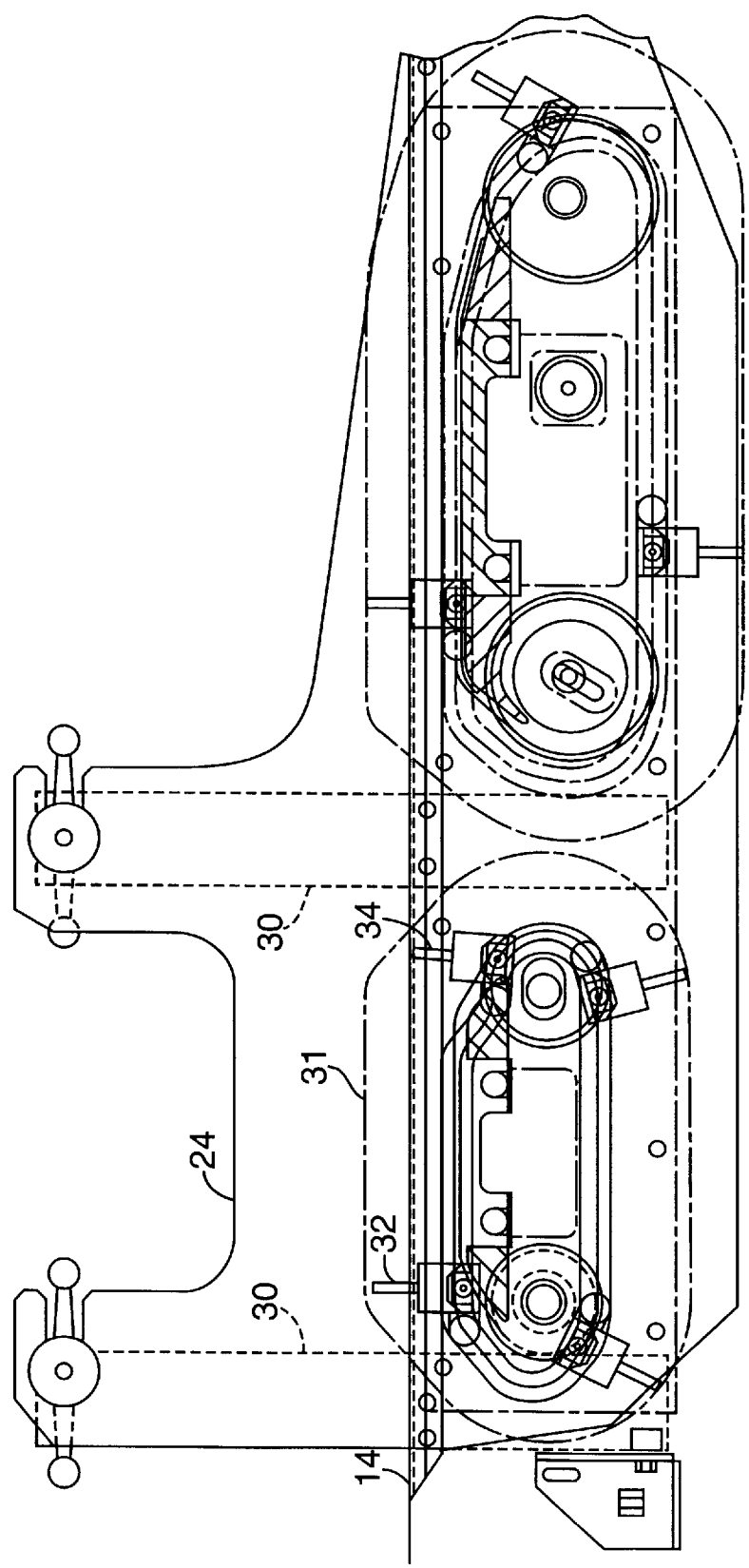
FIG. 4 is an elevational view isolating the first and second pin conveyor sets, together with the third pin conveyor set as shown in FIG. 1.

As best shown in FIG. 3, the lane guides 24, 24 are supported on lane guide support rods 26 from the frame of the machine, indicated generally at 28, on upright stanchions 30. In the side frames 29, 29, a pair of pin conveyor chains follow essentially congruent paths such that each of these two pin sets travel around the same closed path, which is indicated generally at 31 in FIG. 1. The first pin set 32 associated with the first chain or pin conveyor chain serves to hold back the line of articles fed by line pressure along the riding strips as a second pin set 34 moves downwardly out of the path of the articles as it follows the pin conveyor path 31. The path 31 is defined by upstream and downstream sprockets, but the chains are driven independently of one another.

Each of these first and second pin conveyor chains is driven by its own controllable drive motor 36 and 38 respectively, so that the pitch distance defined c between the first and second pin sets can be adjusted to accommodate a different number of articles or articles of different diameter. It is an important feature of the present invention that as one of these pin sets moves below the path of the articles on the riding strips, the other pin set is in position to hold back the articles upstream thereof. This feature serves to release a predetermined number of articles for movement downstream into the path of a third pin conveyor system which accelerates each of these groups of articles and provides a gap between the articles upstream of said third pin conveyor so as to create a gap into which a flight bar can move. The flight bar advances each group of articles through the load station for packing each group in an associated packing case that is fed from below the path of the bottles into the load station (not shown) as indicated generally by the phantom line 40 of FIG. 1.

It is an important feature of the present invention that the third pin conveyor system is timed to the speed of the flight bar conveyor system and to the locations for the first and second pin conveyor systems in order to ensure that the third pin conveyor provides the third pins between the articles at the appropriate point in the line of articles being indexed by the first and second pin conveyor sets.

It is important to note that the line of articles is maintained in article to article contact up until the time that each group of articles is accelerated away from the line by this third pin conveyor set. More particularly, and in contra distinction to the above-mentioned Raudat Pat. No. 4,552,261 and the improvement shown in Pat. No. 5,065,856, the pair of pin conveyor sets upstream of the accelerating third pin conveyor set merely serve to index or to group the articles while they are in contact with one another as a result of slowing the articles moving off the infeed conveyor onto the riding strips. The timing of the three pin conveyor sets is such that the third set of pins moves upwardly between the appropriate rows of articles to create each group of articles and to draw a gap between them and the articles on the riding strip as a result of accelerating each group of articles away from the line and into position for being picked up by the flight bar conveyor system that will move each group of articles into and through the load station in timed relationship with movement of the cases or trays to be loaded all in accordance with conventional practice with continuous motion packers generally.

As mentioned previously, the third pin conveyor system, together with the flight bar conveyor 50 are driven in timed relationship with one another in accordance with conventional techniques. The first and second pin conveyor systems, on the other hand, are driven by independently controllable motors 36 and 38 respectively so that they can be controlled relative to the position and speed of the third conveyor. This result is achieved by providing servo motors 36 and 38 under the control of a computer system which also includes a rotary shaft encoder signal input from the flight bar conveyor 50 and/or the associated third pin conveyor. Thus, the positions for each of the first and second pin conveyor sets can be varied to provide for different numbers of articles in a group or to provide for articles of different diameter in a particular set up for loading articles into differently configured cases or trays.

DESCRIPTION OF ALTERNATIVE EMBODIMENT

In the above-identified preferred embodiment, the third pin conveyor 50 is driven at a constant speed, which is greater than that of the first and second pin conveyors. To provide greater overall operating speeds in a packaging line set up for handling smaller or shorter bottles, this third pin conveyor 50 might also be independently controllable so that a profiled speed increase can be programmed for it to start off at a speed slightly greater that of said first and second pin conveyors and then to be accelerated quickly to at least the speed of the flight bar conveyor 50. Such a refinement will pull the desired gap between successive groups of articles in a shorter distance and hence, quicker time frame, leading to even greater overall packaging line speeds.

In light of the above, it is therefore understood that within the scope of the appended claims, the invention may be practiced otherwise then as specifically described.

I claim:

1. Apparatus for grouping articles and releasing each segregated group to a flight bar conveyor system of the type associated with a continuous motion packer, said apparatus comprising:

an article infeed conveyor, lane guides for confining the articles to movement in parallel side-by-side columns, first and second pin conveyor chains driven in closed paths below the articles in said columns, said first and second pin conveyor chains each driven by independently controllable motors, projecting article engaging pin sets provided at spaced locations on said first and second pin conveyor chains for movement of first and second pin sets between article rows in order to index predetermined groups of articles in said columns and to hold back the articles upstream of said first and second pin sets, said pin sets being so spaced that they define a pitch distance corresponding to the group of articles to be packaged, said first and second pin sets also serving to hold back articles upstream of each such group, a third pin conveyor downstream of said first and second pin sets and acting on each group of articles released by said first and second pin sets for accelerating each group to the speed of the flight bar conveyor system that moves each group in turn through a load station of the packer, and said third pin conveyor operating at a cyclically variable speed to provide a speed profile having an initial speed slightly greater than that of said first and second pin conveyors, each of said independently controllable motors for first and second pin conveyor chains being operated in timed relationship with the speed of said third pin conveyor system.

2. The apparatus according to claim 1, wherein said third pin conveyor operates at a constant speed in excess of that of the speed of said first and second pin conveyors.

3. The apparatus according to claim 2, wherein said first and second pin conveyors operate at a constant speed at least somewhat less than the speed of said article infeed conveyor.

4. The apparatus according to claim 1, further characterized by riding strips along which the articles move under the influence of said first and second pin sets, whereby said first and second pin sets remain above said riding strips to act on the articles upstream thereof holding them back against the line pressure created by said article infeed conveyor.

* * * * *